UNITED STATES PATENT OFFICE.

WILLIAM H. ROSEVELT, OF ROCHESTER, ASSIGNOR TO HIMSELF, DANIEL J. SPRAGUE, AND CHAS. E. BLANCHETT, OF BUFFALO, N. Y.

IMPROVEMENT IN COMPOSITIONS FOR CLEANING GLASS, SILVER-WARE, &c.

Specification forming part of Letters Patent No. 141,819, dated August 12, 1873; application filed June 5, 1873.

*To all whom it may concern:*

Be it known that I, WILLIAM H. ROSEVELT, of the city of Rochester, in the county of Monroe and State of New York, have invented a certain Improved Composition for Cleaning Glass, Plated and Silver Ware, &c., of which the following is a specification:

My invention consists of a composition composed of Paris white, English red lead, glycerine, and borax, compounded in the proportions hereinafter described.

In preparing my improved composition, I take twenty pounds of Paris white, two and one-half pounds of English red lead, two ounces of glycerine, and seven ounces of pulverized borax, and mix thoroughly. The borax is preferably dissolved in about one pint of water before adding it to the other ingredients. While the mass is being thoroughly mixed and kneaded, warm water is added in sufficient quantity to bring the composition to the consistency of bread dough. This operation being completed, the mass is formed in balls or cakes of suitable size, and either dried in the open air, when it will harden in about twenty-four hours, or baked in a stove until sufficiently hardened to be packed for transportation.

In applying my composition for cleaning windows, mirrors, paint-work, plated or silver ware, and similar articles, a damp sponge or cloth is passed over the ball or cake of composition, and the mass adhering thereto distributed over the surface to be cleaned, which latter is then rubbed off with a clean sponge, cloth, or chamois-skin, whereby all the impurities are instantly detached and removed therefrom.

My improved composition is readily and cheaply prepared, requires very little moisture for its application, thereby preventing the soiling of floors, carpets, &c., in cleaning windows, mirrors, and paint-work, and is applied with very little labor, while it is very efficient and quick in its action.

I claim as my invention—

The composition for cleaning glass, plated or silver ware, and other articles, compounded of the ingredients and in the proportions substantially as hereinbefore set forth.

WM. H. ROSEVELT.

Witnesses:
JNO. J. BONNER,
EDWARD WILHELM.